(12) United States Patent
Chua et al.

(10) Patent No.: US 7,535,524 B2
(45) Date of Patent: May 19, 2009

(54) DISPLAY PANEL WITH WAVELENGTH CONVERTING MATERIAL AND CONTROL INTERFACE TO SWITCHABLY CONTROL INDEPENDENT PROJECTION OR NON-PROJECTION OF PRIMARY AND SECONDARY IMAGES

(75) Inventors: Janet Bee Yin Chua, Loveland, CO (US); Yue Hoong Lau, Loveland, CO (US); Tah Wee Tee, Loveland, CO (US); Rene P. Helbing, Palo Alto, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 696 days.

(21) Appl. No.: 11/139,389

(22) Filed: May 27, 2005

(65) Prior Publication Data

US 2006/0232725 A1    Oct. 19, 2006

Related U.S. Application Data

(63) Continuation-in-part of application No. 11/109,247, filed on Apr. 18, 2005, now abandoned.

(51) Int. Cl.
*G02F 1/1335* (2006.01)
(52) U.S. Cl. .............................. 349/68; 349/70; 349/71
(58) Field of Classification Search .............. 349/61–71
See application file for complete search history.

(56) References Cited

U.S. PATENT DOCUMENTS 5,054,892 A * 10/1991 Takanashi et al. ............. 349/30
5,594,560 A * 1/1997 Jelley et al. ................... 359/15
6,576,488 B2 6/2003 Collins, III et al.
6,586,874 B1 7/2003 Komoto et al.
6,650,044 B1 11/2003 Lowery
7,145,912 B1 12/2006 Schwartz
2004/0061810 A1 4/2004 Lowery et al.
2005/0001225 A1 1/2005 Yoshimura et al.
2006/0039152 A1 2/2006 Ito

FOREIGN PATENT DOCUMENTS

| EP | 1 403 689 | 1/2005 |
|---|---|---|
| JP | 5-152609 | 6/1993 |
| JP | 7-99345 | 4/1995 |
| JP | 7-176794 | 7/1995 |
| JP | 8-7614 | 1/1996 |
| WO | WO 02/097324 | 12/2002 |

* cited by examiner

*Primary Examiner*—David Nelms
*Assistant Examiner*—John Heyman

(57) ABSTRACT

In one embodiment, apparatus is provided with a display panel, a wavelength converting material, and a light source. The display panel is provided with an interface to receive control signals defining one or more primary images that are projected from the display panel. The wavelength converting material absorbs light of a first wavelength and emits light of a second wavelength. The wavelength converting material defines a secondary image that is projected from the display panel when the wavelength converting material is illuminated by the light of the first wavelength. The light source causes the wavelength converting material to be illuminated by the light of the first wavelength.

22 Claims, 3 Drawing Sheets

DISPLAY PANEL WITH WAVELENGTH CONVERTING MATERIAL AND CONTROL INTERFACE TO SWITCHABLY CONTROL INDEPENDENT PROJECTION OR NON-PROJECTION OF PRIMARY AND SECONDARY IMAGES

CROSS-REFERENCE TO RELATED APPLICATION

This is a continuation-in-part of U.S. patent application Ser. No. 11/109,247, filed on Apr. 18, 2005 now abandoned, the entire disclosure of which is incorporated into this application by reference.

BACKGROUND OF THE INVENTION

Display systems are incorporated in, or used by, a plurality of devices, including televisions, computer monitors, laptop computers, personal digital assistants (PDAs), mobile phones and watches. Often, there is a need for these devices to incorporate a more or less static component into the image or images that they project. The static image component may take various forms, including those of: a company logo, a battery status indicator, a signal strength indicator, a recording indicator, or an alarm indicator. Static image components may also take the form of text and/or graphic images. To display such an indicator, a new set of control signals must typically be generated for the display system. Sometimes, this can require a great deal of overhead.

SUMMARY OF THE INVENTION

In one embodiment, apparatus comprises a display panel, a wavelength converting material, and a light source. The display panel has an interface to receive control signals defining one or more primary images that are projected from the display panel. The wavelength converting material absorbs light of a first wavelength and emits light of a second wavelength. The wavelength converting material defines a secondary image that is projected from the display panel when the wavelength converting material is illuminated by the light of the first wavelength. The light source is provided to cause the wavelength converting material to be illuminated by the light of the first wavelength.

Another embodiment also comprises a display panel, a wavelength converting material, and a light source. The display panel has an interface to receive control signals defining one or more primary images that are projected from the display panel. The wavelength converting material is deposited on the display panel, absorbs light of a first wavelength, and emits light of a second wavelength. When the wavelength converting material is illuminated by the light of the first wavelength, it projects a backlight through the display panel. The light source is provided to cause the wavelength converting material to be illuminated by the light of the first wavelength.

In yet another embodiment, a backlight for a display comprises a first light source to provide backlighting of at least a first wavelength, and a second light source to produce light of a second wavelength. The second wavelength corresponds to an excitation wavelength of a wavelength converting material. The backlight further comprises at least one mechanism to independently activate and deactivate the first and second light sources.

Other embodiments are also disclosed.

BRIEF DESCRIPTION OF THE DRAWINGS

Illustrative embodiments of the invention are illustrated in the drawings in which.

DETAILED DESCRIPTION

Figure 1:
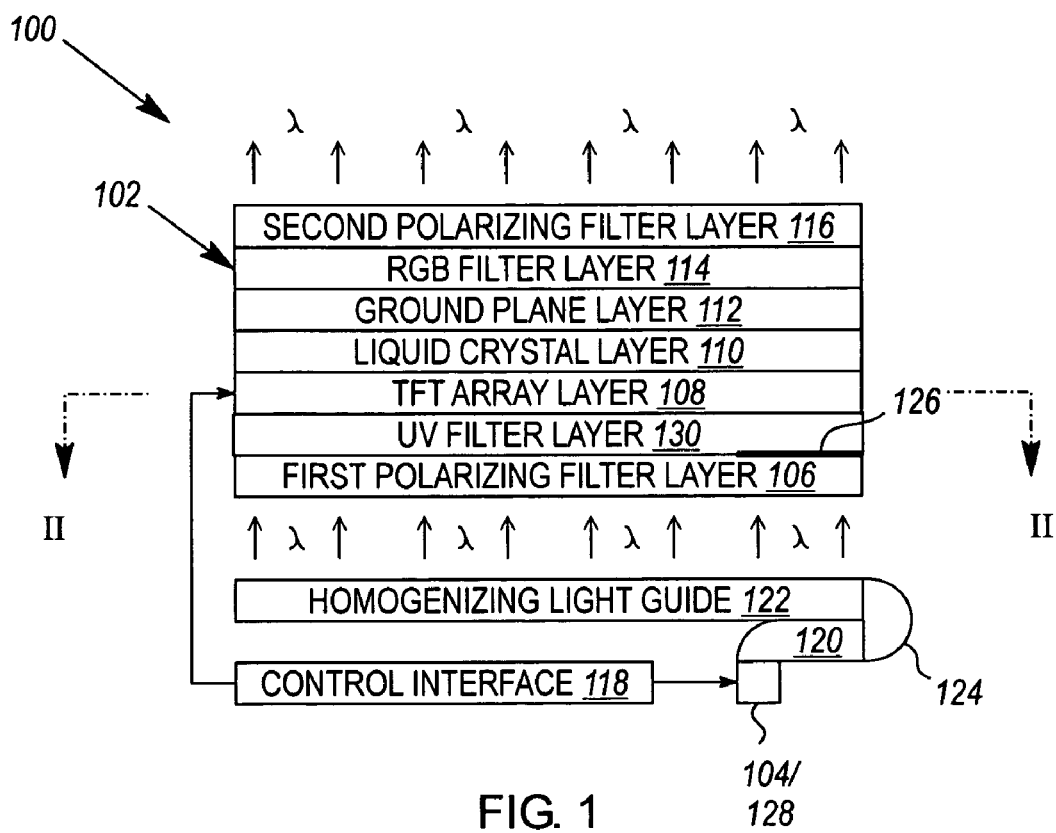
FIG. 1 illustrates an elevation of an exemplary display system.

FIG. 1 illustrates an elevation of an exemplary display system 100. By way of example, the display system 100 is shown to comprise a transmissive liquid crystal display (LCD) panel 102 and a light source 104. The light source 104 provides backlighting for the display panel 102. In alternate embodiments, the LCD could be transreflective or even reflective (with the light source 104 potentially being eliminated in the latter case). The display system 100 could also take other forms, such as that of a digital light processing (DLP) light valve system.

LCD panels may take a number of forms, but typically comprise a plurality of layers 106-116. By way of example, the LCD panel 102 comprises a first polarizing filter layer 106, a thin film transistor (TFT) array layer 108, a liquid crystal layer 110, a ground plane layer 112, a red-green-blue (RGB) filter layer 114, and a second polarizing filter layer 116. In one embodiment, the first polarizing filter layer 106 and TFT array layer 108 are formed on or in a first glass sheet; and the ground plane layer 112, RGB filter layer 114 and second polarizing filter layer 116 are formed on or in a second glass sheet. The liquid crystal layer 110 is then sandwiched between the two glass sheets. The TFT layer 108, liquid crystal layer 110, ground plane layer 112 and RGB filter layer 114 are positioned such that each of the layers contributes to the definition of an array of red, green and blue image pixel areas. The LCD panel 102 further comprises an interface 118 for receiving control signals that define the one or more images that are projected from the display panel 102.

In operation, the exemplary display system 100 works as follows. Backlighting generated by the light source 104 is polarized by the first polarizing filter layer 106 so as to illuminate the TFT array 108 with polarized light. At or about the same time, the TFT array 108 receives control signals provided through the interface 118. In response to the control signals, the transistors of the TFT array 108 are energized or de-energized to form a pattern of localized electrical fields between the TFT array 108 and the ground plane 112. Depending on the image to be generated, the TFT array 108 may cause a different electrical field to be generated for each of the red, green and blue pixel areas defined by the RGB filter layer 114. Depending on the state of each localized electrical field, liquid crystals that are local to the field either align or twist, thereby 1) passing incident backlighting "as is", or 2) rotating incident backlighting by up to ninety degrees. Depending on the type of liquid crystal layer 110 used, the crystals of the layer may be biased to define "normally open" or "normally closed" light paths.

The rotated and non-rotated light exiting the liquid crystal layer 110 illuminates corresponding red, green and blue pixel areas defined by the RGB filter layer 114. Note that, in some cases, the RGB filter layer 114 may comprise separate red, green and blue filter layers. Depending on the orientation of the second polarizing filter layer 116 with respect to the light exiting each pixel area of the liquid crystal layer 110, some or all of the colored light emanating from the RGB filter layer 114 may be blocked by the second polarizing filter layer 116. Thus, the degree to which light is rotated by the liquid crystal layer determines the amount (i.e., intensity) of light that passes through the second polarizing filter layer 116.

By changing the control signals provided to the interface 118, a sequence of images may be projected from the display panel 102.

One can appreciate that the quality of the image(s) projected from the display panel 102 is influenced not only by the quality of the display panel, but also by the quality of the backlighting provided by the light source 104. In this regard, light emitted by the light source 104 may be provided to one or more light guides 120, 122 that are optically positioned between the light source 104 and the display panel 102. By way of example, the display system 100 is shown to comprise two light guides 120, 122. The light guide 120 serves to mix the light emitted by the light source 104. The light guide 120 can be especially useful when the light source 104 comprises one or more light-emitting diodes (LEDs) of different color (e.g., red, green and blue LEDs). In most cases, it is desirable to have the light guide 120 mix the light emitted by the light source 104 so that the light that exits the light guide 120 is approximately white.

To minimize the width of the display system 100, the light guide 122 may be stacked on top of the light guide 120. Light emitted by the light guide 120 may then be reflected around and into an edge of the light guide 122 by, for example, a mirror 124. The light guide 122 may serve to homogenize the light emitted by the light guide 120, thereby providing substantially uniform backlighting to the display panel 102. Preferably, the light guide 122 comprises deformities that enable it to bend received light approximately normal to the light guide's light-emitting surface (i.e., the top surface 126 in FIG. 1). In this manner, the light guide 122 can project a quasi-uniform plane of light toward the display panel 102. By way of example, the deformities of the light guide 122 may comprise: 1) ridges in the bottom surface of the light guide, 2) reflective particles embedded in the light guide, 3) a roughening of the top or bottom surface of the light guide, or 4) a plurality of collimating lenses formed on the top surface of the light guide. In some cases, a non-specular reflector may be placed behind the light guide 122 to improve the brightness and uniformity of light emitted from the light guide 122. Further details on the construction, use and orientation of light guides 120, 122 are provided by Van Hees, "Compact Illumination System and Display Device", Publication No. WO 02/097324 A1; and Harbers et al., "LED Backlighting for LCD HDTV", Journal of the Society for Information Display, pp. 347-350 (2002).

Figure 2:
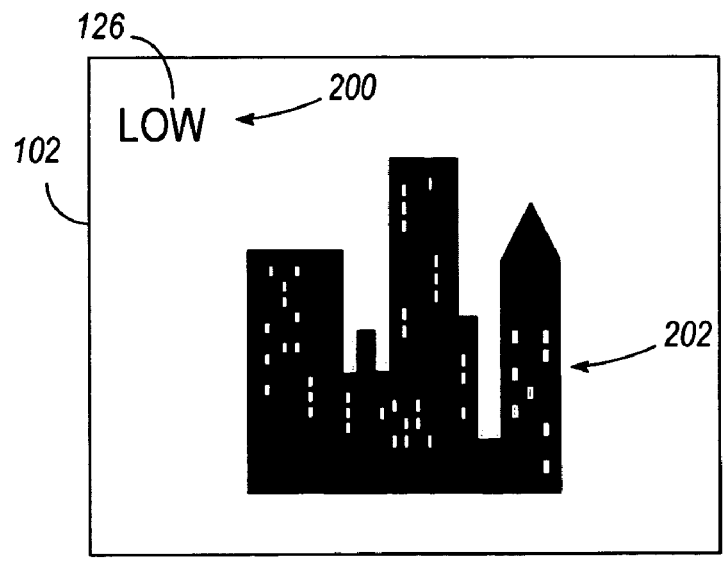
FIG. 2 illustrates a plan view of the display panel and wavelength converting material shown in FIG. 1.

During the course of using a display system such as that which is shown in FIG. 1, it is often necessary to incorporate a more or less static image component into the image that is projected from the display panel 102. The static image component may be textual and/or graphic in nature and may take various forms, including those of: a company logo, a battery status indicator, a signal strength indicator, a recording indicator, or an alarm indicator. To display such an image component, a new set of control signals must typically be generated for the display panel 102, which can require a great deal of overhead. The display system 100 therefore utilizes a wavelength converting material 126 to define a secondary image 200 (FIG. 2) that can be projected from the display panel 102.

The wavelength converting material 126 serves to absorb light of a first wavelength and emit light of a second wavelength. Thus, when illuminated by light of the first wavelength, the wavelength converting material 126 emits light of the second light wavelength, and thereby projects its secondary image from the display panel 102. Conversely, the wavelength converting material 126 may be selected or deposited such that, in the absence of light of the first wavelength, the wavelength converting material 126 is transmissive (e.g., transparent).

Figure 3:
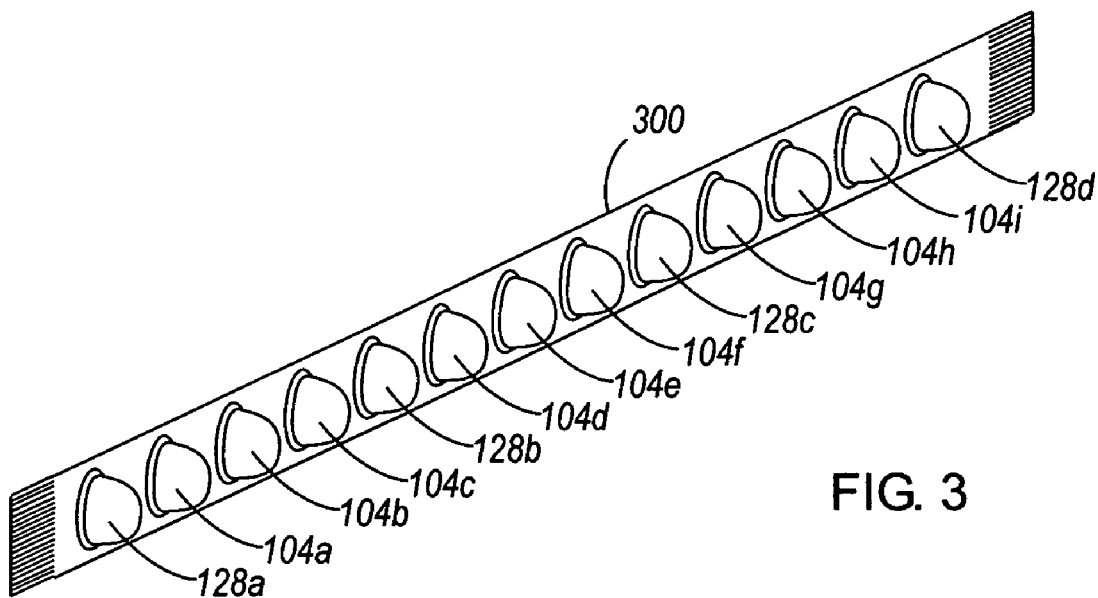
FIG. 3 illustrates a perspective view of a substrate on which the light sources shown in FIG. 1 are mounted.

A light source 128 may be provided for causing the wavelength converting material 126 to be illuminated by light of the first wavelength. As shown in FIGS. 1 & 3, the light source 128 may comprise one or more LEDs 128a-128d mounted on the same substrate 300 as the light source 104a-104i that provides backlighting for the display panel 102. See FIG. 3. Note that, often, it will require fewer LEDs 128a-128d to excite the wavelength converting material 126 than it takes to provide backlighting for the display panel 102.

The wavelength converting material 126, light guides 120, 122 (if provided), and light source 128 may be chosen such that the appropriate excitation wavelength(s) are provided to the wavelength converting material 126 when the light source 128 is activated. In some cases, this may be done by enabling the light emitted by the light source 128 to leak through or around the light guides 120, 122. By way of example, light could be allowed to leak around the light guide 122 by opening up the top of the mirror 124, or by repositioning the light source 128 between the light guide 122 and polarizing filter 106. In other cases, the light source 128 may be chosen such that it emits a light that, when altered by the light guides 120, 122, is of the appropriate wavelength to excite the wavelength converting material 126.

In one embodiment, the light source 128 emits ultraviolet (UV) light, and the excitation wavelength of the wavelength converting material 126 corresponds to that of the ultraviolet light. In another embodiment, the light source 128 emits bluish light, and the excitation wavelength of the wavelength converting material 126 corresponds to that of the bluish light. In yet another embodiment, the light source 128 may emit both ultraviolet and bluish light, with the excitation wavelength of the wavelength converting material 126 corresponding to a combination of the ultraviolet and bluish light. The light source 128 may also emit a combination of reddish, greenish and bluish light, with the excitation wavelength of the wavelength converting material 126 corresponding to any or all of: the reddish light, the greenish light, the bluish light, or some component or mixture thereof.

In some cases, the display panel 102 may be provided with a filter layer 130 through which the secondary image is projected. If properly selected, the filter layer 130 may be used to block passage of some or all of the light (e.g., ultraviolet light) that is used to excite the wavelength converting material 126. Although FIG. 1 shows one position for the filter 130, it may be placed in various positions that are optically "downstream" from the wavelength converting material 126. Also, and depending on the wavelength of light that is used to excite the wavelength converting material 126, the RGB filter layer 114 may serve to block the excitation light.

In one embodiment, the wavelength converting material 126 is phosphorescent, comprising any one or more organic or inorganic phosphors. Inorganic phosphors, in turn, may comprise conventional phosphors or quantum dot/nanophosphors. Inorganic phosphors include, but are not limited to, Garnet-based phosphors, Oxide-based phosphors, Sulfide-based phosphors, Orthosilicates, Silicates and Thiogallates, including the following specific phosphor compositions, which may be used alone or in combination to define an image:

Red phosphors: SrS, ZnSe, CaS, (Zn,Cd)S, CdS, $Mg_4GeO_{5.5}F:Mn^{4+}$, $Y_2O_2S:Eu$
Orange phosphors: ZnSeS
Green phosphors: $SrGa_2S_4$, $BaGa_4S_7$, ZnS
Blue phosphors: $BaMg_2Al_{16}O_{27}$
Yellow phosphors: $Y_3Al_5O_{12}$ (YAG), $Tb_3Al_5O_{12}$ (TAG)

By way of example, the wavelength converting material 126 may be caused to emit white light if it comprises a combination of red and green phosphors, orange and green phosphors, or red, blue and green phosphors.

Figure 4:
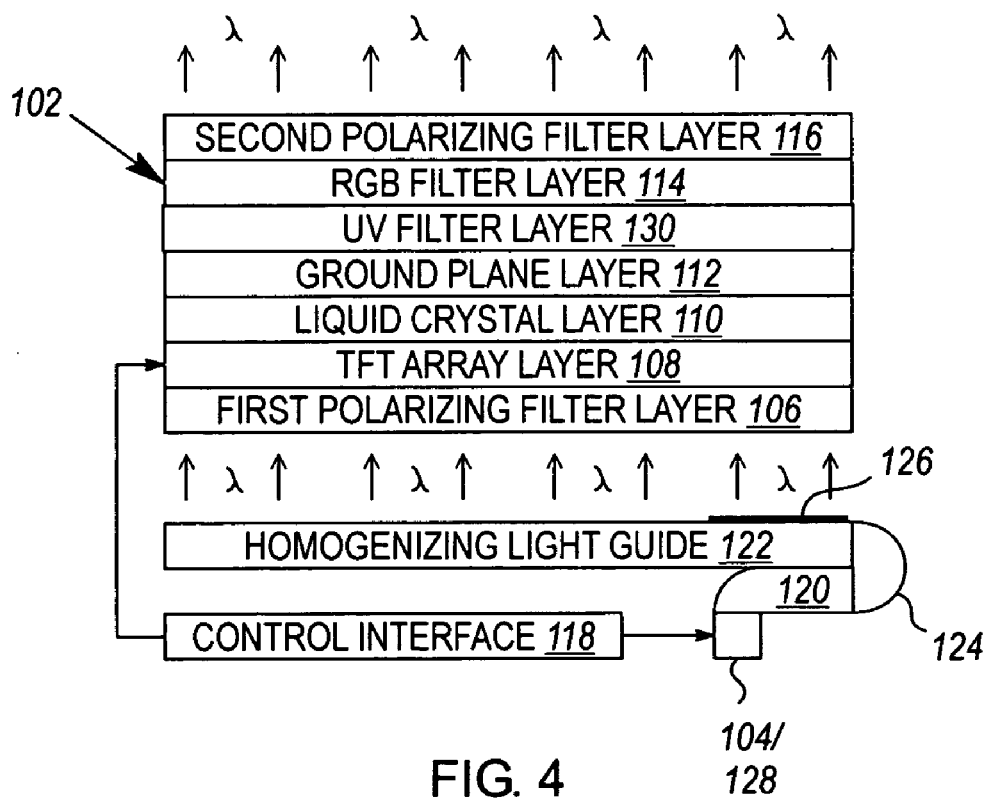
FIGS. 4 & 5 illustrate alternate placements of the wavelength converting material shown in FIG. 1.
Figure 5:
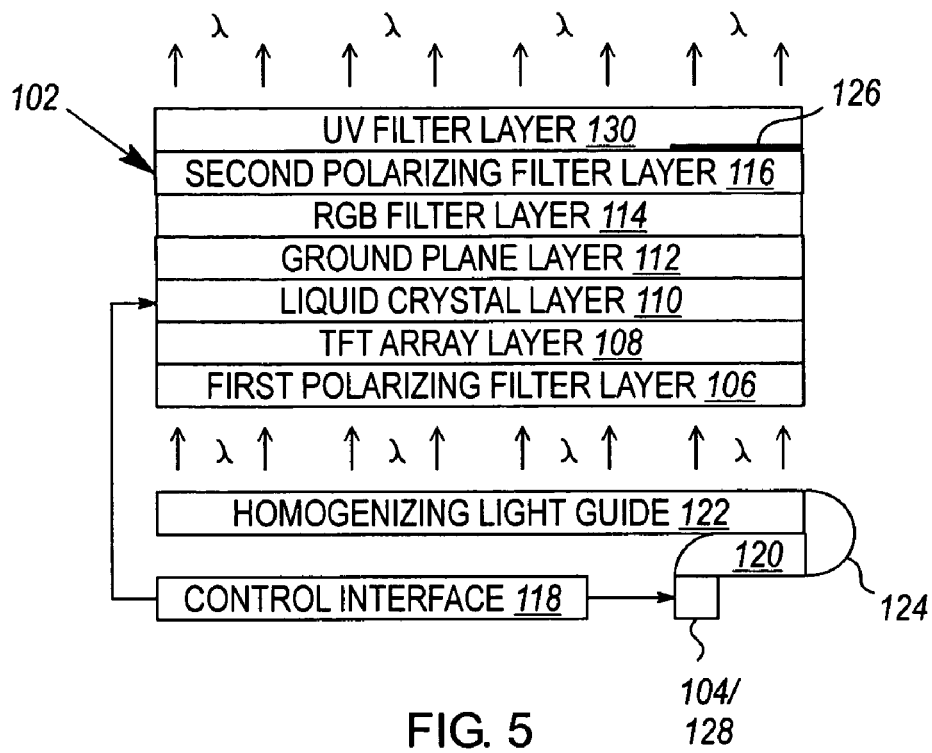

Preferably, the wavelength converting material 126 is deposited on the display panel 102, although it may also be deposited on the light-emitting surface 132 of the light guide 120 (see FIG. 4), or on a separate sheet or structure that is positioned between the light guide and display panel (not shown). If deposited on the display panel 102, the wavelength converting material 126 may be deposited in a variety of locations. In one embodiment (see FIG. 1), the wavelength converting material 126 is deposited on a surface of the display panel 102 positioned between the first polarizing filter and liquid crystal layers 106, 110 of the display panel 102. In another embodiment, the wavelength converting material 126 is deposited on a layer of the display panel that is further from the light source than the liquid crystal layer (e.g., the exterior surface of the display panel 102; see FIG. 5). It is noted that, when the wavelength converting material 126 is positioned on the light receiving side of the polarizing filter layer 106, its emitted light will only be projected from the display panel 102 when appropriate paths through the liquid crystal array 110 are "open".

To aid in the deposition and retention of the wavelength converting material 126, it may be mixed with one or more other materials, such as silicone, epoxy, glass, a hybrid of silicone and epoxy, or a UV curable epoxy. The material 126 may also be mixed with a UV inhibitor to mitigate degradation of the display system 100 due to any UV light source used to activate the material 126 (or any external UV light). The material 126 may also be mixed with a diffusing agent so as to disperse the light emitted by the material 126.

In effect, the secondary image 200 projected by the wavelength converting material 126 may be superimposed onto a primary image 202 generated by the display panel 102. See FIG. 2. A mechanism, such as hardware (e.g., a sensor), firmware, software or a user-operated button may be used to activate and deactivate the light source 128 during use of the display panel 102. Preferably, one or more mechanisms are provided for independently activating the light sources 104, 128. Also, preferably, the light wavelengths emitted by the two light sources 104, 128 differ enough such that the wavelength converting material 126 is not excited, and is substantially transparent, when only the light source 104 is activated.

In one embodiment, the light emitted by the light source 128 may illuminate most or all of the display panel 102. In another embodiment, the light source 128 may be positioned or configured so as to only illuminate an area of the display panel 102 that substantially coincides with an area defined by the wavelength converting material 126.

Figure 6:
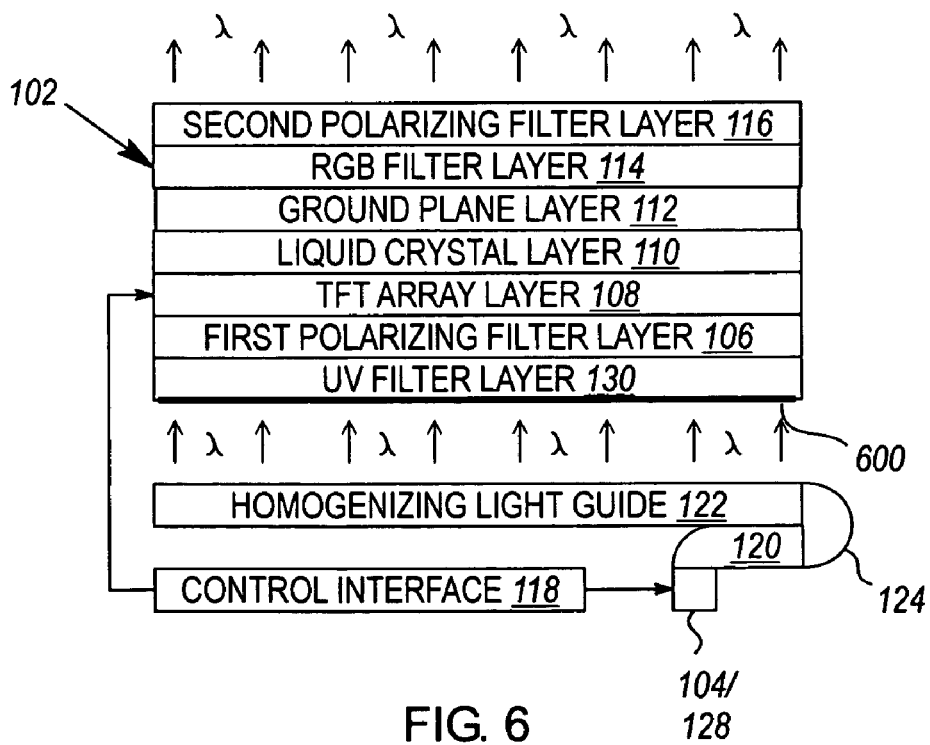
FIG. 6 illustrates the use of a wavelength converting material to provide additional backlighting for the display panel shown in FIG. 1.

Although the embodiments discussed above describe the wavelength converting material 126 as forming an image 200, a wavelength converting material 600 can also be applied to the display panel 102 in a uniform, semi-transparent coating. See FIG. 6. In this manner, the material 600 could be used to project additional backlighting through the display panel 102 (and in some cases, the material 600 may be used to provide a color tint to, or to change the color point of, another form of backlighting, such as RGB or white LED backlighting).

By way of example, the light sources 104, 128 used to provide backlighting and secondary image excitation have been disclosed to be LEDs. In alternate embodiments, the light sources 104, 128 could take the form of other semiconductor light sources (e.g., laser diodes), bulbs (e.g., cold cathode fluorescent lamps (CCFLs)), or some combination thereof.

What is claimed is:

1. A display system, comprising:
    a display panel operably connected to a control interface configured to provide control signals thereto defining at least one primary image and at least one secondary image for projection from the display panel;
    a wavelength converting material that absorbs light of a first wavelength and emits light of a second wavelength, the wavelength converting material defining the secondary image when the wavelength converting material is illuminated by the light of the first wavelength, the wavelength converting material being substantially transparent to light of a third wavelength;
    a first light source configured to cause the wavelength converting material to be illuminated by the light of the first wavelength and project the secondary image from the display panel;
    a second light source configured to illuminate at least portions of the display panel and cause the display panel to project the primary image therefrom;
    wherein the first, second and third wavelengths are different from one another, and the control interface is configured to switchably control independent projection or non-projection of the primary and secondary images from the display panel.

2. The system of claim 1, wherein the wavelength converting material is deposited on the display panel.

3. The system of claim 1, wherein the display panel comprises a plurality of layers, including a polarizing filter layer and a liquid crystal layer; wherein the polarizing filter layer is positioned closer to the light source than the liquid crystal layer; and wherein the wavelength converting material is deposited on a surface of the display panel positioned between the polarizing filter layer and the liquid crystal layer.

4. The system of claim 1, wherein the display panel comprises a plurality of layers; and wherein the wavelength converting material is deposited on a layer of the display panel that is further from the light source than a liquid crystal layer.

5. The system of claim 1, wherein the display panel comprises a plurality of layers, including a filter layer through which the secondary image is projected; and wherein the filter layer blocks passage of at least some of the light of the first wavelength.

6. The system of claim 1, further comprising one or more light guides, optically positioned between the light source and the display panel.

7. The system of claim 1, wherein the first light source emits ultraviolet light; and wherein the light of the first wavelength is ultraviolet light.

8. The system of claim 1, wherein at least one of the first and second light sources emits reddish, greenish and bluish light; and wherein the light of at least one of the first and third wavelengths is the reddish light, greenish light, bluish light, or a component or mixture thereof.

9. The system of claim 1, wherein the first light source emits bluish light; and wherein the light of the first wavelength is bluish light.

10. The system of claim 1, wherein the first light source emits ultraviolet and bluish light; wherein the light of the first wavelength is ultraviolet light; and wherein the wavelength converting material also absorbs the bluish light and emits the light of the second wavelength.

11. The system of claim 1, wherein the wavelength converting material is phosphorescent.

12. The system of claim 1, wherein the wavelength converting material comprises a pattern of conventional phosphors, quantum dot phosphors or nanophosphors.

13. The system of claim 1, wherein the wavelength converting material is mixed with silicone, epoxy, glass, a hybrid of silicone and epoxy, or a UV curable epoxy.

14. The system of claim 1, wherein the wavelength converting material is mixed with a UV inhibitor.

15. The system of claim 1, wherein the wavelength converting material is mixed with a diffusing agent.

16. The system of claim 1, wherein a mechanism to activate and deactivate the first light source during use of the display panel comprises the control interface.

17. The system of claim 1, wherein the secondary image is a company logo.

18. The system of claim 1, wherein the secondary image is a battery status indicator.

19. The system of claim 1, wherein the display panel is a liquid crystal display (LCD) panel.

20. The system of claim 1, wherein at least one of the first and second light sources comprises at least one light-emitting diode (LED).

21. The system of claim 1, wherein the first light source illuminates an area of the display panel that substantially coincides with an area defined by the wavelength converting material.

22. The backlight of claim 1, further comprising a light guide to i) receive light emitted by the first and second light sources, ii) alter at least some of the light emitted by the first light source, and ii) pass unaltered, at least some of the light emitted by the second light source.

* * * * *